(12) United States Patent
Kukino et al.

(10) Patent No.: US 6,337,152 B1
(45) Date of Patent: Jan. 8, 2002

(54) CUTTING TOOL MADE OF $Al_2O_3$-COATED CBN-BASED SINTERED MATERIAL

(75) Inventors: Satoru Kukino; Junichi Shiraishi; Tetsuo Nakai, all of Hyogo (JP)

(73) Assignee: Sumitomo Electric Industries, Inc., Osaka (JP)

( * ) Notice: Subject to any disclaimer, the term of this patent is extended or adjusted under 35 U.S.C. 154(b) by 0 days.

(21) Appl. No.: 09/492,128

(22) Filed: Jan. 27, 2000

(51) Int. Cl.⁷ .............................. B32B 33/00; B32B 9/04
(52) U.S. Cl. .................. 428/698; 428/216; 428/336; 428/702; 428/704; 51/307; 51/309; 501/96.1; 501/96.4
(58) Field of Search .................. 428/469, 698, 428/702, 704, 216, 336; 501/96.4, 96.1; 51/307, 309

(56) References Cited

U.S. PATENT DOCUMENTS

| | | | |
|---|---|---|---|
| 5,135,801 A | * | 8/1992 | Nystrom et al. |
| 5,326,380 A | * | 7/1994 | Yao et al. |
| 5,503,913 A | | 4/1996 | Konig et al. |
| 5,543,176 A | * | 8/1996 | Chatfield et al. |
| 5,639,285 A | * | 6/1997 | Yao et al. |
| 5,652,045 A | * | 7/1997 | Nakamura et al. |
| 5,676,496 A | * | 10/1997 | Littecke et al. |
| 5,705,263 A | * | 1/1998 | Lenander et al. |
| 5,712,030 A | * | 1/1998 | Goto et al. |
| 5,786,069 A | * | 7/1998 | Ljungberg et al. |
| 5,902,671 A | * | 5/1999 | Kutscher |
| 5,945,207 A | * | 8/1999 | Kutscher et al. |
| 6,001,758 A | * | 12/1999 | Fukaya et al. |
| 6,008,153 A | * | 12/1999 | Kukino et al. |
| 6,090,476 A | * | 7/2000 | Thysell et al. |

FOREIGN PATENT DOCUMENTS

| | | | |
|---|---|---|---|
| DE | 41 26 851 A1 | | 2/1993 |
| JP | 58061253 A | * | 4/1983 |
| JP | 59-8679 | | 1/1984 |

* cited by examiner

Primary Examiner—Deborah Jones
Assistant Examiner—Jennifer McNeil
(74) Attorney, Agent, or Firm—McDermott, Will & Emery

(57) ABSTRACT

A cutting tool according to the present invention is coated with one or more $Al_2O_3$ layers on at least a part of the surface of a cBN-based sintered material substrate taking part in cutting. The sintered material substrate is made of cBN in an amount of from 20% to 99% by volume and $Al_2O_3$ having an average crystalline particle diameter of not more than 1 $\mu$m in an amount of from not less than 1.0% to less than 10% by volume. The $Al_2O_3$ layer has a thickness (d) of from 0.5 $\mu$m to 50 $\mu$m. The average crystalline particle diameter (s) of $Al_2O_3$ is from 0.01 $\mu$m to 4 $\mu$m if the thickness (d) of the $Al_2O_3$ layer is from 0.5 $\mu$m to 25 $\mu$m or from not less than 0.01 $\mu$m to not more than 10 $\mu$m if the thickness (d) of the $Al_2O_3$ layer is from more than 25 $\mu$m to 50 $\mu$m.

8 Claims, No Drawings

US 6,337,152 B1

CUTTING TOOL MADE OF Al$_2$O$_3$-COATED CBN-BASED SINTERED MATERIAL

BACKGROUND OF THE INVENTION

1. Field of the Invention

The present invention relates to a cutting tool made of a cubic boron nitride (cBN) sintered material substrate coated with Al$_2$O$_3$. More particularly, the present invention relates to a cutting tool made of Al$_2$O$_3$-coated cBN-based sintered material having improved wear resistance and breakage resistance.

2. Description of the Related Art

Al$_2$O$_3$ is a material optimum for cutting iron-based materials because of its excellent chemical stability and hardness. However, Al$_2$O$_3$ exhibits a poor toughness. Therefore, a cutting tool mainly composed of Al$_2$O$_3$ has a deteriorated stability against tool failure to disadvantage. In order to overcome this difficulty, a cutting tool consisting of a cemented carbide substrate having a relatively excellent toughness coated with Al$_2$O$_3$ has been commercialized.

In recent years, there is a growing need for high speed and efficiency and dry cutting in response to the trends of environment-friendly production. In the conventional tools, however, the cemented carbide substrate deforms excessively plastically at high cutting temperature, resulting in that the coating layer easily peels off or is destroyed.

As a means for solution to the problems, a method for coating a cBN-based sintered material excellent in high temperature hardness with Al$_2$O$_3$ has been proposed in JP-A-59-8679 (The term "JP-A" as used herein means an "unexamined published Japanese patent application"). However, since the adhesion between cBN-based sintered material and Al$_2$O$_3$ coating layer is insufficient and the optimization of the crystallinity of Al$_2$O$_3$ is insufficient, a remarkable enhancement of wear resistance and breakage resistance is not exhibited in cutting of hard materials such as hardened steel or high speed and efficiency cutting of steel.

SUMMARY OF THE INVENTION

It is an object of the present invention to provide a cutting tool which exhibits an excellent flank wear resistance and crater wear resistance particularly in cutting of high hardness difficult-to-cut ferrous materials or high speed and efficiency cutting of steel.

A cutting tool according to the present invention is coated with one or more Al$_2$O$_3$ layers on at least a part of the surface of a cBN-based sintered material substrate taking part in cutting. The sintered material substrate comprises cBN in an amount of 20% to 99% by volume and Al$_2$O$_3$ having an average crystalline particle diameter of not more than 1 $\mu$m in an amount of not less than 1.0% to less than 10% by volume. The Al$_2$O$_3$ layer has a thickness (d) of 0.5 $\mu$m to 50 $\mu$m. The average crystalline particle diameter (s) of Al$_2$O$_3$ is from 0.01 $\mu$m to 4 $\mu$m if the thickness (d) of the Al$_2$O$_3$ layer is from 0.5 $\mu$m to 25 $\mu$m (0.5 $\mu$m$\leq$d$\leq$25 $\mu$m), and that of Al$_2$O$_3$ is from 0.01 $\mu$m to 10 $\mu$m if the thickness (d) of the Al$_2$O$_3$ layer is from more than 25 $\mu$m to 50 $\mu$m (25 $\mu$m<d$\leq$50 $\mu$m).

The incorporation of a proper amount of Al$_2$O, in a cBN-based sintered material substrate makes it possible to increase the adhesion of the Al$_2$O$_3$ layer or interlayer made of TiC$_x$N$_y$O$_z$ having an excellent bonding power with Al$_2$O$_3$, thereby enhancing the cutting properties. A particularly preferred content of Al$_2$O$_3$ is form 3.0% to less than 5.0%. The reason why the adhesion of the Al$_2$O$_3$ layer or interlayer can be thus increased is presumably as follows:

(1) Al$_2$O$_3$ constituting the coating layer and TiC$_x$N$_y$O$_z$ undergo nucleation with Al$_2$O$_3$ contained in cBN-based sintered material substrate as a starting point; and.

(2) the incorporation of Al$_2$O$_3$ in cBN-based sintered material substrate causes the residual stress characteristic to cBN-based sintered material substrate to change, thereby relaxing misfit of coating layer to residual stress (thermal stress, internal stress).

The homogeneous incorporation of fine Al$_2$O$_3$ particles having a particle diameter of not more than 1 $\mu$m in cBN-based sintered material substrate makes it possible to accelerate the formation of fine homogenous nuclei during the formation of Al$_2$O$_3$ or TiC$_x$N$_y$O$_z$ layer and hence form an Al$_2$O$_3$ layer having an excellent crystallinity and adhesion. If the content of Al$_2$O$_3$ falls below 1.0% by volume, it causes uneven nucleation during the formation of coating layer, thereby exerting an insufficient effect. On the contrary, if the content of Al$_2$O$_3$ exceeds 10% by volume, the mechanical properties inherent to Al$_2$O$_3$ is presumably reflected in the mechanical properties of cBN-based sintered material, thereby drastically deteriorating the breakage resistance of cBN-based sintered material substrate.

The Al$_2$O$_3$ layer is preferably mainly composed of $\alpha$-Al$_2$O$_3$. The coating of cBN-based sintered material substrate with $\alpha$-Al$_2$O$_3$ with a good adhesion makes it possible to inhibit wear on relieve face and crater wear and hence drastically prolong the life of tool. The coating of cBN-based sintered material substrate with $\kappa$-Al$_2$O$_3$ with a good adhesion, too, makes it possible to inhibit crater wear and prolong the life of tool. However, wear on relieve face can be little inhibited.

Further, the Al$_2$O$_3$ layer can be oriented on (012), (104), (110), (113), (024) or (116) plane with an orientation index of not less than 1.0 to form a coating layer excellent in wear resistance and strength. This orientation index can be defined by the following equation. The method for determining orientation index is described also in WO96/15286 (PCT/SE95/01347), etc.

TC(hkl)=I(hkl)/Io(hkl)×[(1/n)Σ{(hkl)/Io(hkl)}]$^{-1}$ where

I(hkl): Intensity of (hkl) diffraction ray in XRD;

Io(hkl): Diffraction intensity in ASTM card of XRD; and n: Number of diffraction rays used in calculation ((hkl) diffraction rays used are (012),(104),(110),(113),(024) and (116))

In the foregoing cutting tool, the Al$_2$O$_3$ layer may be complexed with the TiC$_x$N$_y$O$_z$ layer to form a laminate. Specific examples of the composite structure include (1) structure comprising an interlayer made of TiC$_x$N$_y$O$_z$ formed on the interface of Al$_2$O$_3$ layer with cBN-based sintered material substrate, (2) structure comprising a TiC$_x$N$_y$O$_z$ layer provided interposed between a plurality of Al$_2$O$_3$ layers, and (3) structure comprising a TiC$_x$N$_y$O$_z$ layer provided as an outermost layer.

Referring to the reason why the thickness of the Al$_2$O$_3$ layer is defined to a range of from 0.5 $\mu$m to 50 $\mu$m, if the thickness of the Al$_2$O$_3$ layer falls below the lower limit, the resulting coating effect is insufficient. On the contrary, if the thickness of the Al$_2$O$_3$ layer exceeds the upper limit, the coating layer is more liable to peeling, chipping or breakage. The thickness of the Al$_2$O$_3$ layer is preferably from about 3 to 40 $\mu$m. In particular, if the thickness of the Al$_2$O$_3$ layer is not more than 25 $\mu$m and the average crystal particle diameter (s) of Al$_2$O$_3$ is from 0.01 $\mu$m to 4 $\mu$m, the resulting product is excellent in flank wear resistance. If the thickness of the $Al_2O_3$ layer is more than 25 μm and the average crystal particle diameter (s) of $Al_2O_3$ is from 0.01 μm to 10 μm. the resulting product is excellent in crater wear resistance. If there are a plurality of $Al_2O_3$ layers, the total thickness of these $Al_2O_3$ layers is used to see whether the thickness of the $Al_2O_3$ layer is not more than 25 μm.

The formation of the foregoing $Al_2O_3$ layer or $TiC_xN_yO_z$ layer can be accomplished by CVD method such as thermal CVD method, plasma CVD method and moderate temperature CVD method or PVD method such as sputtering method and ion plating method.

On the other hand, the sintered material substrate is composed of cBN and a binder phase. If the content of cBN is not less than 20% by volume, the production of a thick binder phase which forms a mechanically weak point can be inhibited. The binder phase is preferably made of at least one of nitride, carbide and boride of metals belonging to the groups 4a, 5a and 6a in the periodic table and mutual solid-solution thereof as a main component besides $Al_2O_3$. The binder phase may further contains at least one of Al and Si incorporated therein. For the preparation of the sintered material substrate, a plasma sintering apparatus, hot press, ultrahigh pressure sintering apparatus, etc. may be used.

Since the cutting tool according to the present invention is made of a cBN-based sintered material substrate mainly composed of cBN having a hardness next to diamond, it exhibits an excellent plastic deformation resistance. Further, the coating with $\alpha$-$Al_2O_3$, which is chemically stable, having a controlled structure makes it possible to improve crater resistance without causing chipping or peeling. Accordingly, the cutting tool according to the present invention exhibits a prolonged life in cutting of high hardness materials such as hardened steel or high speed and efficiency cutting of steel, which is impossible with existing tools due to the rise in cutting temperature.

DETAILED DESCRIPTION OF THE INVENTION

The present invention will be described in detail referring to the following specific examples.

EXAMPLE 1 cBN-based sintered material substrates shaped according to SNGN120408 (ISO Specification) having different formulations set forth in Table 1 were prepared. Subsequently, these cBN-based sintered material substrates were each coated with $Al_2O_3$ by an ordinary CVD method under the conditions set forth in Table 2 (Condition 1) and Table 3 (Condition 2). In some of these inserts, a $TiC_{0.5}N_{0.5}$ layer is provided by an ordinary CVD method as an interlayer between the cBN-based sintered material substrate and the $Al_2O_3$ layer.

TABLE 1

| No. | Particle size (μm) cBN | Particle size (μm) $Al_2O_3$ | Composition (vol-%) Others | Composition (vol-%) $Al_2O_3$ |
|---|---|---|---|---|
| A | ≦8 | <1 | cBN: 45; TiN: 30; $TiB_2$: 5; AlN: 5; impurities such as W and Co: 15 | 0 |
| B | ≦8 | <1 | cBN: 45; TiN: 30; $TiB_2$: 5; AlN: 5; impurities such as W and Co: 14.1 | 0.9 |
| C | ≦8 | <1 | cBN: 45; TiN: 30; $TiB_2$: 5; AlN: 5; impurities such as W and Co: 14 | 1.0 |

TABLE 1-continued

| No. | Particle size (μm) cBN | Particle size (μm) $Al_2O_3$ | Composition (vol-%) Others | Composition (vol-%) $Al_2O_3$ |
|---|---|---|---|---|
| D | ≦8 | <1 | cBN: 45; TiN: 30; $TiB_2$: 5; AlN: 5; impurities such as W and Co: 11 | 4.0 |
| E | ≦8 | <1 | cBN: 45; TiN: 30; $TiB_2$: 5; AlN: 5; impurities such as W and Co: 6 | 9.0 |
| F | ≦8 | <1 | cBN: 45; TiN: 30; $TiB_2$: 5; AlN: 5; impurities such as W and Co: 5 | 10 |
| G | ≦8 | 1–1.5 | cBN: 45; TiN: 30; $TiB_2$: 5; AlN: 5; impurities such as W and Co: 11 | 4.0 |

TABLE 2

Details of $Al_2O_3$ coating method

| Gas introduced | Step 1 | Step 2 |
|---|---|---|
| $CO_2$ (%) | — | 5 |
| $AlCl_3$ (%) | — | 5 |
| CO (%) | — | — |
| $H_2S$ (%) | — | 0.1 |
| HCl (%) | — | 5 |
| $H_2$ (%) | 100 | 74.9 |
| Pressure (Torr) | 80 | 80 |
| Temperature (° C.) | 920 | 920 |
| Processing time (min) | 10 | 1,000 |

TABLE 3

Details of $Al_2O_3$ coating method

| Gas introduced | Step 1 | Step 2 | Step 3 |
|---|---|---|---|
| $CO_2$ (%) | 5 | 5 | 5 |
| $AlCl_3$ (%) | — | 5 | 5 |
| CO (%) | 2.5 | 2.5 | — |
| $H_2S$ (%) | — | — | 0.1 |
| HCl (%) | — | 0.8 | 5 |
| $H_2$ (%) | 92.5 | 86.7 | 74.9 |
| Pressure (Torr) | 80 | 80 | 80 |
| Temperature (° C.) | 920 | 920 | 920 |
| Processing time (min) | 10 | 30 | 1,000 |

The $Al_2O_3$-coated sintered materials thus obtained were then each analyzed by electron microscope (SEM: scanning electron microscope) and EDS (energy-disperse X-ray spectroscopy). As a result, the $Al_2O_3$ layer was found to have a thickness of 25 μm and contain $Al_2O_3$ particles having an average particle diameter (S) of 4.5 μm.

The cutting tools made of $Al_2O_3$-coated cBN-based sintered material thus prepared were then each precisely examined for the conditions of face and flank taking part in cutting by XRD (X-ray diffraction). As a result, $\kappa$-$Al_2O_3$ was found to have been formed under Condition 1 set forth in Table 2. Under Condition 2 set forth in Table 3, $\alpha$-$Al_2O_3$ which is oriented on (012) plane with an orientation index TC(012) of 1.1 was found to have been formed. The orientation index was determined by the previously described equation.

Subsequently, these inserts were each evaluated for cutting properties. Referring to the cutting conditions, the material to be cut was a round rod according to SUJ2 with a hardness HRC 65 having a V-shaped groove at two points along the longitudinal periphery thereof. The cutting speed was 150 m/min. The depth of cut was 0.2 mm. The feed rate was 0.1 mm/rev. The cutting was effected in a dry process. For the evaluation of cutting properties, a stereomicroscope and a surface profile measuring instrument were used to measure flank wear width and crater wear depth and observe how the insert had been worn. For comparison, a commercially available cBN-based sintered material for cutting hardened steel free of $Al_2O_3$ coating layer was similarly evaluated. The results are set forth in Table If the particle diameter of $Al_2O_3$ particles in the substrate exceeds 1 μm (No. 11), the adhesion of $Al_2O_3$ coating layer is insufficient. This is because the homogeneous incorporation of finely divided $Al_2O_3$ particles having a particle diameter of not more than 1 μm in cBN-based sintered material substrate makes it possible to accelerate the forma-

TABLE 4

Cutting properties of $Al_2O_3$-coated cBN-based sintered material

| No. | cBN-based sintered material substrate | Coating conditions | Flank wear width during 1 km cutting (μm) | Crater wear depth during 1 km cutting (μm) | Life against tool failure |
|---|---|---|---|---|---|
| 1 | A | Condition 2 | — | — | $Al_2O_3$ layer peeled at 0.5 km |
| 2 | A | Interlayer + Condition 2 | — | — | $Al_2O_3$ layer peeled at 0.6 km |
| 3 | B | Condition 2 | 41 | 12 | $Al_2O_3$ layer peeled at 1.5 km |
| 4 | B | Interlayer + Condition 2 | 40 | 12 | $Al_2O_3$ layer peeled at 1.4 km |
| 5 | C | Condition 2 | 40 | 11 | Broken together with substrate at 5 km |
| 6 | C | Interlayer + Condition 2 | 40 | 12 | Broken together with substrate at 5 km |
| 7 | D | Condition 2 | 38 | 11 | Broken together with substrate at 8 km |
| 8 | D | Condition 1 | 58 | 13 | Broken together with substrate at 4 km |
| 9 | E | Condition 2 | 42 | 12 | Broken together with substrate at 7 km |
| 10 | F | Condition 2 | 59 | 12 | Broken together with substrate at 3 km |
| 11 | G | Condition 2 | 41 | 12 | $Al_2O_3$ layer peeled at 1.2 km |
| 12* | D | Not coated | 60 | 22 | Broken at 3 km |
| 13* | Commercially available cBN-based sintered material tool for cutting hardened steel | | 61 | 27 | Broken at 3 km |

*Comparative Example

Summarizing Table 4, the following results were obtained.

If the substrate is free of $Al_2O_3$ or the content of $Al_2O_3$ falls below 1% by volume (Nos. 1–4), the adhesion of the coating layer is insufficient and a remarkable improvement of tool life cannot be observed. On the contrary, even if the content of $Al_2O_3$ is not less than 10% by volume (No. 10), the resulting improvement is insufficient. If the content of $Al_2O_3$ falls below 1.0% by volume, it causes uneven nucleation during coating, exerting an insufficient effect. On the contrary, if the content of $Al_2O_3$ is not less than 10%, the mechanical properties inherent to $Al_2O_3$ is presumably reflected in the mechanical properties of cBN-based sintered material, drastically deteriorating the breakage resistance of cBN-based sintered material substrate.

On the other hand, as can be seen in the results of Nos. 5, 6, 7 and 9, the incorporation of a proper amount of $Al_2O_3$ in a cBN-based sintered material substrate makes it possible to increase the adhesion of the $Al_2O_3$ layer or interlayer made of TiCxNyOz having an excellent bonding strength with $Al_2O_3$, enhancing the cutting properties. The reason why the adhesion of the $Al_2O_3$ layer or interlayer can be thus increased is presumably as follows:

(1) $Al_2O_3$ constituting the coating layer and TiCxNyOz undergo nucleation with $Al_2O_3$ contained in cBN-based sintered material substrate as a starting point; and (2) the incorporation of $Al_2O_3$ in cBN-based sintered material substrate causes the residual stress characteristic to cBN-based sintered material substrate to change, relaxing misfit of coating layer to residual stress (thermal stress, internal stress).

tion of fine homogeneous nuclei during the formation of $Al_2O_3$ or $TiC_xN_yO_z$ layer and hence form an $Al_2O_3$ layer having an excellent crystallinity and adhesion.

As can be seen in the comparison of Nos. 7 and 8, the $Al_2O_3$ layer is preferably mainly composed of α-$Al_2O_3$. The coating of cBN-based sintered material substrate with α-$Al_2O_3$ with a good adhesion makes it possible to inhibit wear on relieve face and crater wear and hence drastically prolong the life of tool. The coating of cBN-based sintered material substrate with κ-$Al_2O_3$ with a good adhesion, too, makes it possible to inhibit crater wear and prolong the life of tool. However, wear on relieve face can be little inhibited.

EXAMPLE 2 cBN-based sintered material substrates containing cBN particles having an average particle diameter of not more than 2 μm and $Al_2O_3$ particles having an average particle diameter of less than 1 μm incorporated therein were each coated with TiCN and TiN by an ordinary CVD method, and then coated with $Al_2O_3$ by the same CVD method as in Example 1. During this procedure, the disposition of the cBN-based sintered material, the film-forming temperature, the carrier gas concentration, etc. were adjusted. In this manner, various cutting tools made $Al_2O_3$-coated cBN-based sintered material set forth in Tables 5, 6 and 7 were prepared.

These cutting tools made of $Al_2O_3$-coated cBN-based sintered material were then each precisely examined for the conditions of face and flank taking part in cutting by XRD. As a result, it was found that an α-$Al_2O_3$ coating layer having TC (hkl) of not less than 0.9 had been formed. TC(hkl) is the maximum orientation index of (hkl) plane among (012), (104), (110), (113), (024) and (116) planes.

TABLE 5

| No. | Composition of cBN-based sintered material (vol-%) | Constitution of coating layer *1 (μm) | TC(hkl) *2 | S *2 |
|---|---|---|---|---|
| 1 | cBN: 55; TiN: 25; α-Al$_2$O$_3$; 0.9; TiB$_2$: 5; AlN: 5; impurities | Al$_2$O$_3$ layer: 30 | TC(012) 2 | 4.5 |
| 2 | cBN: 55; TiN: 25; α-Al$_2$O$_3$; 1.0; TiB$_2$: 5; AlN: 5; impurities | Al$_2$O$_3$ layer: 30 | TC(012) 2 | 4.5 |
| 3 | cBN: 55; TiN: 25; α-Al$_2$O$_3$; 1.0; TiB$_2$: 5; AlN: 5; impurities | Al$_2$O$_3$ layer/TiC$_{0.5}$N$_{0.5}$ columnar crystal inhibition layer/ Al$_2$O$_3$ layer: 14/2/14 | TC(012) 2 | 2.5 |
| 4 | cBN: 55; TiN: 25; α-Al$_2$O$_3$; 1.0; TiB$_2$: 5; AlN: 5; impurities | Al$_2$O$_3$ layer: 30; TiN0.5 surface layer | TC(012) 2 | 4.5 |
| 5 | cBN: 55; TiN: 25; α-Al$_2$O$_3$; 3.0; TiB$_2$: 5; AlN: 5; impurities | Al$_2$O$_3$ layer: 30; TiN0.5 surface layer | TC(012) 2 | 4.5 |
| 6 | cBN: 55; TiN: 25; α-Al$_2$O$_3$; 4.5; TiB$_2$: 5; AlN: 5; impurities | Al$_2$O$_3$ layer: 30 | TC(012) 2 | 4.5 |
| 7 | cBN: 55; TiN: 25; α-Al$_2$O$_3$; 5.5; TiB$_2$: 5; AlN: 5; impurities | Al$_2$O$_3$ layer: 30 | TC(012) 2 | 4.5 |
| 8 | cBN: 55; TiN: 25; α-Al$_2$O$_3$; 9.5; TiB$_2$: 5; AlN: 5; impurities | Al$_2$O$_3$ layer: 30 | TC(012) 2 | 4.5 |
| 9 | cBN: 55; TiN: 24; a-Al$_2$O$_3$; 10.5; TiB$_2$: 5; AlN: 5; impurities | Al$_2$O$_3$ layer: 30 | TC(012) 2 | 4.5 |

*1 Texture coefficient of α-Al$_2$O$_3$
*2 Average crystal particle diameter of α-Al$_2$O$_3$

TABLE 6

| No. | Composition of cBN-based sintered material (vol-%) | Constitution of coating layer *1 (μm) | TC(hkl) *2 | S *2 |
|---|---|---|---|---|
| 10 | cBN: 55; TiN: 25; α-Al$_2$O$_3$; 4.5; TiB$_2$: 5; AlN: 5; impurities | Al$_2$O$_3$ layer: 52 | TC(012) 2 | 4.5 |
| 11 | cBN: 55; TiN: 25; α-Al$_2$O$_3$; 4.5; TiB$_2$: 5; AlN: 5; impurities | Al$_2$O$_3$ layer: 50 TiC$_{0.5}$N$_{0.5}$ interlayer: 1 | TC(012) 2 | 4.5 |
| 12 | cBN: 55; TiN: 25; α-Al$_2$O$_3$; 4.5; TiB$_2$: 5; AlN: 5; impurities | Al$_2$O$_3$ layer: 55 TiC$_{0.5}$N$_{0.5}$ interlayer: 1 | TC(012) 2 | 4.5 |
| 13 | cBN: 55; TiN: 25; α-Al$_2$O$_3$; 4.5; TiB$_2$: 5; AlN: 5; impurities | Al$_2$O$_3$ layer: 50; TiC$_{0.5}$N$_{0.5}$ interlayer: 1 | TC(012) 2 | 10 |
| 14 | cBN: 55; TiN: 25; α-Al$_2$O$_3$; 4.5; TiB$_2$: 5; AlN: 5; impurities | Al$_2$O$_3$ layer: 50; TiC$_{0.5}$N$_{0.5}$ interlayer: 1 | TC(012) 2 | 12 |
| 15 | cBN: 55; TiN: 25; α-Al$_2$O$_3$; 4.5; TiB$_2$: 5; AlN: 5; impurities | Al$_2$O$_3$ layer: 30 | TC(012) 0.9 | 3.0 |
| 16 | cBN: 55; TiN: 25; α-Al$_2$O$_3$; 4.5; TiB$_2$: 5; AlN: 5; impurities | Al$_2$O$_3$ layer: 30 | TC(012) 1.0 | 3.0 |
| 17 | cBN: 55; TiN: 25; α-Al$_2$O$_3$; 4.5; TiB$_2$: 5; AlN: 5; impurities | Al$_2$O$_3$ layer: 30 | TC(012) 2 | 3.0 |
| 18 | cBN: 55; TiN: 25; α-Al$_2$O$_3$; 4.5; TiB$_2$: 5; AlN: 5; impurities | Al$_2$O$_3$ layer: 30 | TC(012) 2.5 | 3.0 |

*1 Texture coefficient of α-Al$_2$O$_3$
*2 Average crystal particle diameter of α-Al$_2$O$_3$

TABLE 7

| No. | Composition of cBN-based sintered material (vol-%) | Constitution of coating layer *1 (μm) | TC(hkl) *2 | S *2 |
|---|---|---|---|---|
| 19 | cBN: 20; TiN: 60; α-Al$_2$O$_3$: 4.5; TiB$_2$: 5; AlN: 5; impurities | Al$_2$O$_3$ layer: 30 | TC(012) 2 | 4.5 |
| 20 | cBN: 18; TiN: 60; α-Al$_2$O$_3$: 4.5; TiB$_2$: 5; AlN: 5; impurities | Al$_2$O$_3$ layer: 30; TiC$_{0.5}$N$_{0.5}$ interlayer: 1 | TC(012) 2 | 4.5 |
| 21 | cBN: 55; TiN: 25; α-Al$_2$O$_3$: 4.5; TiB$_2$: 5; AlN: 5; impurities | Al$_2$O$_3$ layer: 30 TiC$_{0.5}$N$_{0.5}$ interlayer: 1 | TC(012) 2 | 4.5 |
| 22 | cBN: 55; TiN: 25; α-Al$_2$O$_3$: 4.5; TiB$_2$: 5; AlN: 5; impurities | Al$_2$O$_3$ layer: 30; TiC$_{0.5}$N$_{0.5}$ interlayer: 1 | TC(012) 2 | 4.5 |
| 23 | cBN: 55; TiN: 25; α-Al$_2$O$_3$: 4.5; TiB$_2$: 5; AlN: 5; impurities | Al$_2$O$_3$ layer: 30; TiC$_{0.5}$N$_{0.5}$ interlayer: 1: | TC(012) 2 | 4.5 |
| 24 | cBN: 55; TiN: 25; α-Al$_2$O$_3$: 4.5; TiB$_2$: 5; AlN: 5; impurities | Al$_2$O$_3$ layer: 30 | TC(012) 2 | 4.5 |
| 25 | cBN: 55; TiN: 25; α-Al$_2$O$_3$: 4.5; TiB$_2$: 5; AlN: 5; impurities | Al$_2$O$_3$ layer: 30 | TC(012) 2 | 4.5 |
| 26 | Uncoated cBN sintered material/cBN: 55; TiN: 25; α-Al$_2$O$_3$: 4.5 TiB$_2$: 5; AlN: 5; impurities | | | |
| 27 | Comparative: commercially available Al$_2$O$_3$-coated cemented carbide for cutting steel | | | |
| 28 | Comparative: commercially available TiCN-coated thermet for cutting steel | | | |

*1 Texture coefficient of α-Al$_2$O$_3$
*2 Average crystal particle diameter of α-Al$_2$O$_3$ Subsequently, these inserts were each evaluated for cutting properties. Referring to the cutting conditions, the material to be cut was a round rod according to SMC435 with a hardness HRC of 20 having a V-shaped groove at two points along the longitudinal periphery thereof. The cutting speed was 600 m/min. The depth of cutting was 0.5 mm. The feed rate was 0.5 mm/rev. The cutting was effected in a dry process. For the evaluation of cutting properties, a stereomicroscope and a surface profile measuring instrument were used to measure wear and observe how the insert had been worn. For comparison, a commercially available sintered material for cutting hardened steel free of Al$_2$O$_3$ coating layer was similarly evaluated. The results are set forth in Tables 8 and 9.

TABLE 8

Results of evaluation of cutting properties of various cutting tools made of Al$_2$O$_3$-coated cBN-based sintered material

| No. | Flank wear width during 1 km cutting (μm) | Crater wear depth during 1 km cutting (μm) | Form of wear during 1 km cutting | Tool life |
|---|---|---|---|---|
| 1 | — | — | — | Coating layer peeled and broken at 0.5 km |
| 2 | 140 | 7 | Slightly chipped | Lost together with substrate at 5.5 km |
| 3 | 140 | 7 | Smooth | Broken together with substrate at 7 km |
| 4 | 140 | 7 | Slightly chipped | Broken together with substrate at 5.5 km |
| 5 | 140 | 7 | Slightly chipped | Broken together with substrate at 7 km |
| 6 | 140 | 7 | Slightly chipped | Broken together with substrate at 7 km |
| 7 | 140 | 7 | Slightly chipped | Broken together with substrate at 6 km |
| 8 | 145 | 7 | Slightly chipped | Broken together with substrate at 5.5 km |
| 9 | 145 | 7 | Slightly chipped | Broken together with substrate at 1.5 km |
| 10 | — | — | — | Peeled during film forming |
| 11 | 140 | 8 | Slightly chipped | Broken together with substrate at 6.5 km |
| 12 | 140 | 12 | Slightly chipped | Coating layer broken at 1.5 km |

TABLE 8-continued

Results of evaluation of cutting properties of various cutting
tools made of Al₂O₃-coated cBN-based sintered material

| No. | Flank wear width during 1 km cutting (μm) | Crater wear depth during 1 km cutting (μm) | Form of wear during 1 km cutting | Tool life |
|---|---|---|---|---|
| 13 | 140 | 7 | Slightly chipped | Broken together with substrate at 5.5 km |
| 14 | 140 | 7 | Drastically chipped | Coating layer broken at 1.8 km |

TABLE 9

Results of evaluation of cutting properties of various cutting
tools made of Al₂O₃-coated cBN-based sintered material

| No. | Flank wear width during 1 km cutting (μm) | Crater wear depth during 1 km cutting (μm) | Form of wear during 1 km cutting | Tool life |
|---|---|---|---|---|
| 15 | 205 | 17 | Slightly chipped | Cutting not allowed due to excessive wear at 2 km |
| 16 | 150 | 9 | Slightly chipped | Broken together with substrate at 5.5 km |
| 17 | 130 | 6 | Smooth | Broken together with substrate at 7.5 km |
| 18 | 125 | 5 | Smooth | Broken together with substrate at 8 km |
| 19 | 140 | 7 | Slightly chipped | Broken together with substrate at 4.5 km |
| 20 | 142 | 8 | Slightly chipped | Broken together with substrate at 3.0 km |
| 21 | 138 | 7 | Slightly chipped | Broken together with substrate at 7 km |
| 22 | 139 | 6 | Slightly chipped | Broken together with substrate at 7 km |
| 23 | 141 | 7 | Slightly chipped | Broken together with substrate at 7 km |
| 24 | 142 | 7 | Slightly chipped | Broken together with substrate at 7 km |
| 25 | 139 | 7 | Slightly chipped | Broken together with substrate at 7 km |
| 26 | 210 | 21 | Smooth | Cutting not allowed due to excessive wear at 2 km |
| 27 | — | — | — | Substrate plastically deformed to cause peeling and breakage of coating layer at 1.4 km |
| 28 | 250 | — | Siightly chipped | Cutting not allowed due to excessive wear at 1.5 km |

As compared with the conventional cBN-based sintered material tool, coated cBN-based sintered material tool, coated cemented carbide tool for cutting steel and TiCN-coated thermet, the examples of the present invention made of an α-Al₂O₃ coating layer having TC(hkl) of not less than 1.0, TC(hkl) indicating the maximum orientation index of (hkl) plane among (012), (104), (110), (113), (024) and (116) planes, show a drastic improvement of flank wear resistance and crater wear resistance.

The reason why the examples of the present invention show a drastic improvement of flank wear resistance and crater wear resistance is presumably as follows:

α-Al₂O₃ is more excellent in mechanical properties such as hardness and toughness on (012), (104), (110), (113), (024) and (116) planes than on other crystal faces; and Al₂O₃ grows as a columnar crystal. By allowing the columnar crystal to undergo orientation growth rather than random growth, the introduction of defects due to mechanical interference between crystalline particles can be inhibited, drastically enhancing the toughness of the coating layer.

On the other hand, the cutting tool of No. 15 having an orientation index TC(012) of 0.9 exhibits a deteriorated wear resistance, showing no improvement of tool life.

When the thickness of the Al₂O₃ layer, if provided alone, exceeds 50 μm (no. 10), the cutting tool is liable to cracking or peeling, showing a drastic deterioration of cutting properties. On the other hand, the provision of a TiC$_x$N$_y$O$_z$ layer as an interlayer on the interface of the cBN-based sintered material substrate with the Al₂O₃ coating layer makes it possible to inhibit the occurrence of cracking or peeling at the Al₂O₃ coating layer (no. 10). This is presumably because misfit of cBN-based sintered material substrate to the residual stress of the coating layer is relaxed by the TiC$_x$-

$N_yO_z$ layer as an interlayer. However, even if the foregoing interlayer is interposed between the layers, when the thickness of the $Al_2O_3$ layer exceeds 50 μm (No. 12), the resulting cutting properties are drastically deteriorated similarly.

As in Example 1, the homogeneous incorporation of fine $Al_2O_3$ particles having a particle diameter of not more than 1 μm in cBN-based sintered material substrate makes it possible to accelerate the formation of fine homogeneous nuclei during the formation of $Al_2O_3$ or $TiC_xN_yO_z$ layer and hence form an $Al_2O_3$ layer having an excellent crystallinity and adhesion. The thickness of all the $Al_2O_3$ coating layers are defined to be not less than 25 μm. It can be presumed from Nos. 5 and 17 that if the average crystal particle diameter (s) of α-$Al_2O_3$ particles constituting the α-$Al_2O_3$ coating layer is great under these conditions, the resulting product exhibits a deteriorated toughness. It can also be presumed from Nos. 13 and 14 that if the thickness of the α-$Al_2O_3$ coating layer is not more than 50 μm, when the average crystal particle diameter (s) of α-$Al_2O_3$ layer exceeds 10 μm, the α-$Al_2O_3$ coating layer can be remarkably broken.

The comparison of Nos. 1 to 9 shows that if the content of $Al_2O_3$ falls below 1.0% by volume, it causes uneven nucleation sparsely scattered during the formation of coating layer. Thus, the content of $Al_2O_3$ needs to be not less than 1.0% by volume. In particular, if the content of $Al_2O_3$ is not less than 3%, the resulting cutting tool exhibits an excellent adhesion. On the contrary, if the content of $Al_2O_3$ exceeds 5% by volume, the density of nuclei thus formed is too great, causing the introduction of defects into the crystal due to mutual mechanical interference during the growth of $Al_2O_3$ or $TiC_xN_yO_z$ and hence deteriorating the toughness of the coating layer. In particular, if the content of $Al_2O_3$ exceeds 10%, the mechanical properties inherent to $Al_2O_3$ is presumably reflected in the mechanical properties of cBN-based sintered material, drastically deteriorating the breakage resistance of cBN-based sintered material substrate. Accordingly, the content of $Al_2O_3$ in the cBN-based sintered material substrate is preferably from not less than 1.0% by volume to less than 10% by volume, more preferably from not less than 3% by volume to less than 5% by volume.

If the content of cBN in the cBN-based sintered material substrate falls below 20% by volume (No. 20), the resulting effect of cBN, which is inherently excellent in mechanical properties such as hardness and toughness, is presumably lessened, drastically deteriorating the breakage resistance of the cBN-based sintered material substrate.

The $Al_2O_3$-coated tool according to the present invention, even if coated with a single α-$A_2O_3$ layer, exhibits a better toughness than the conventional $Al_2O_3$-coated tools. In particular, the α-$Al_2O_3$ coating layer of No. 3 provided as a columnar crystal inhibition layer between $Al_2O_3$ layers has fine columnar crystal particles homogeneously oriented and thus exhibits an excellent toughness. Accordingly, the α-$Al_2O_3$ coating layer of No. 3 presumably can be smoothly worn without slightly chipping itself and shows a prolonged life against loss as compared with other α-$Al_2O_3$ coating layers.

EXAMPLE 3 cBN-based sintered material substrates made of cBN particles having an average particle diameter of not more than 5 μm and $Al_2O_3$ particles having an average particle diameter of less than 1 μm incorporated therein were each coated with $Al_2O_3$ by the same CVD method as in Example 1. During this procedure, the disposition of the cBN-based sintered material, the film-forming temperature, the carrier gas concentration, etc. were adjusted. In this manner, various cutting tools made of $Al_2O_3$-coated cBN-based sintered material set forth in Table 10 were prepared.

These cutting tools made of $Al_2O_3$-coated cBN-based sintered material were then each precisely examined for the conditions of face and flank taking part in cutting by XRD. As a result, it was found that an α-$Al_2O_3$ coating layer having TC hkl) of not less than 0.9 had been formed. TC(hkl) is the maximum orientation index of (hkl) plane among (012), (104), (110), (113), (024) and (116) planes.

TABLE 10

| No. | Composition of cBN-based sintered material (vol-%) | Constitution of coating layer *1 (μm) | TC (hkl) *2 | S *2 |
|---|---|---|---|---|
| 1 | cBN: 55; TiN: 25; α-$Al_2O_3$; 4.5; $TiB_2$: 5; AlN: 5; impurities | $Al_2O_3$ layer: 4 | TC(012) 1.8 | 0.5 |
| 2 | cBN: 55; TiN: 25; α-$Al_2O_3$; 4.5; $TiB_2$: 5; AlN: 5; impurities | $Al_2O_3$ layer: 4 | TC(104) 1.8 | 0.5 |
| 3 | cBN: 55; TiN: 25; α-$Al_2O_3$; 4.5; $TiB_2$: 5; AlN 5; impurities | $Al_2O_3$ layer: 4 | TC(116) 1.8 | 0.5 |
| 4 | cBN: 55; TIN: 25 α-$Al_2O_3$; 4.5; $TiB_2$: 5; AlN 5; impurities | $Al_2O_3$ layer: 4 | TC(110) 1.8 | 0.5 |
| 5 | cBN: 55; TiN: 25 α-$Al_2O_3$; 4.5; $TiB_2$: 5; AlN 5; impurities | $Al_2O_3$ layer: 4 | TC(113) 1.8 | 0.5 |
| 6 | cBN: 55; TiN: 25 α-$Al_2O_3$; 4.5; $TiB_2$: 5; AlN 5; impurities | $Al_2O_3$ layer: 4 | TC(024) 1.8 | 0.5 |
| 7 | cBN: 55; TiN: 25, α-$Al_2O_3$; 4.5; $TiB_2$: 5; AlN: 5; impurities | $Al_2O_3$ layer: 4 | TC(104) 0.9 | 0.5 |
| 8 | cBN: 55; TiN: 25; α-$Al_2O_3$; 4.5; $TiB_2$: 5; AlN: 5; impurities | $Al_2O_3$ ₁ayer: 4 | TC(104) 1.1 | 0.5 |

*1: Texture coefficient of α-$Al_2O_3$
*2: Average crystal particle diameter of α-$Al_2O_3$

TABLE 11

| No. | Formulation of cBN-based sintered material (vol-%) | Constitution of coating layer *1 (μm) | TC (hkl) *2 | S *2 |
|---|---|---|---|---|
| 9 | cBN: 55; TiN: 25; α-Al$_2$O$_2$; 4.5; TiB$_2$: 5; AlN: 5; impurities | Al$_2$O$_3$ layer: 4 | TC(104) 2.3 | 0.5 |
| 10 | cBN: 55; TiN: 25;α-Al$_2$O$_3$; 4.5; TiB$_2$: 5; AlN: 5; impurities | Al$_2$O$_2$ layer: 7 | TC(104) 1.8 | 0.5 |
| 11 | cBN: 55; TiN: 25; α-Al$_2$O$_3$; 4.5; TiB$_2$: 5; AlN: 5; impurities | Al$_2$O$_3$ layer: 25 | TC(104) 1.8 | 0.5 |
| 12 | cBN: 55; TiN: 25; α-Al$_2$O$_2$; 4.5; TiB$_2$: 5; AlN: 5; impurities | Al$_2$O$_3$ layer: 25 | TC(104) 1.8 | 4.0 |
| 13 | cBN: 55; TiN: 25; α-Al$_2$O$_3$; 4.5; TiB$_2$: 5; AlN: 5; impurities | Al$_2$O$_2$ layer: 25 | TC(104) 1.8 | 4.5 |
| 14 | Uncoated cBN sintered material/cBN: 55; TiN: 25; α-Al$_2$O$_3$: 4.5; TiB$_2$: 5; AlN: 5; impurities | | | |
| 15 | Comparative: commercially available Al$_2$O$_3$-coated cemented carbide for cutting steel | | | |
| 16 | Comparative: commercially available Al$_2$O$_2$-TiC-based ceramics for cutting steel | | | |

*1: Texture coefficient of α-Al$_2$O$_3$
*2: Average crystal particle diameter of α-Al$_2$O$_3$ Subsequently, these tips were each evaluated for cutting properties. The cutting conditions were the same as used in Example 2. In some detail, the material to be cut was a round rod according to SMC435 with a hardness HRC of 20 having a V-shaped groove at two points along the longitudinal periphery thereof. The cutting speed was 600 m/min. The depth of cut was 0.5 mm. The feed rate was 0.5 mm/rev. The cutting was effected in a dry process. For the evaluation of cutting properties, a stereomicroscope and a surface profile measuring instrument were used to measure wear and observe how the insert had been worn. For comparison, a commercially available sintered material for cutting hardened steel free of Al$_2$O$_3$ coating layer was similarly evaluated. The results are set forth in Table 12.

TABLE 12

Results of evaluation of cutting properties of various cutting tools made of Al$_2$O$_3$-coated cBN-based sintered material

| No. | Flank wear width during 1 km cutting (μm) | Crater wear depth during 1 km cutting (μm) | Form of wear during 1 km cutting | Tool life |
|---|---|---|---|---|
| 1 | 110 | 15 | Smooth | Broken together with substrate at 4.5 km |
| 2 | 110 | 15 | Smooth | Broken together with substrate at 4.5 ks |
| 3 | 110 | 14 | Smooth | Broken together with substrate at 4.5 km |
| 4 | 110 | 13 | Smooth | Broken together with substrate at 4.5 km |
| 5 | 110 | 14 | Smooth | Broken together with substrate at 4.5 km |
| 6 | 100 | 14 | Smooth | Broken together with substrate at 4.5 km |
| 7 | 200 | 17 | Slightly chipped | Cutting not allowed due to excessive flank wear at 2.5 km |
| 8 | 120 | 15 | Smooth | Broken together with substrate at 4 km |
| 9 | 100 | 15 | Smooth | Broken together with substrate at 5 km |
| 10 | 100 | 11 | Smooth | Broken together with substrate at 5 km |
| 11 | 100 | 7 | Smooth | Broken together with substrate at 5 km |
| 12 | 120 | 8 | Smooth | Broken together with substrate at 5.5 km |
| 13 | 145 | 7 | Slightly chipped | Broken together with substrate at 4.5 km |
| 14 | 210 | 20 | Smooth | Cutting not allowed due to excessive wear at 1.9 km |
| 15 | — | — | — | Substrate plastically deformed to cause peeling and loss at 1.3 km |
| 16 | — | — | Slightly chipped | Heavily broken at 0.1 km |

The results in Table 12 gave the following discoveries. The comparison of Nos. 11 to 13 shows that as the average crystal particle diameter of α-$Al_2O_3$ particles constituting the α-$Al_2O_3$ coating layer increases, the wear resistance and the smoothness of the worn surf ace are deteriorated. This is presumably attributed to the low toughness of coarse-grained α-$Al_2O_3$. If the thickness of the α-$Al_2O_3$ coating layer is not more than 25 μm, when the average crystal particle diameter of α-$Al_2O_3$ particles exceeds 4 μm, the resulting product exhibits a drastically deteriorated wear resistance. The product of No. 7, which exhibits TC(104) of less than 1.0, exhibits an excessive flank wear and thus shows a reduced tool life.

As compared with Example 2, Example 3 exhibits an increased crater wear mainly attributed to thermal wear by the factor corresponding to the reduction of the thickness of the α-$Al_2O_3$ coating layer, which is excellent in thermal stability. However, Example 3 exhibits a reduction in flank wear mainly attributed to mechanical wear by the factor corresponding to the reduction of the average crystal particle diameter of the α-$Al_2O_3$ particles. Thus, the product of Example 3 shows a smoothly worn surface.

Accordingly, in cutting requiring high dimensional precision or high surface integrity, it is preferred that the thickness (d) of the α-$Al_2O_3$ coating layer be from 0.5 μm to 25 μm (0.5 μm≦d≦25 μm) and the average crystal particle diameter (s) of the α-$Al_2O_3$ particles be from 0.01 μm to 4 μm . If the life against tool failure is emphasized, it is preferred that the thickness (d) of the α-$Al_2O_3$ coating layer be from 25 μm to 50 μm (25 μm<d≦50 μm) and the average crystal particle diameter (s) of the α-$Al_2O_3$ particles be from 0.01 μm to 10 Mm.

As mentioned above, the present invention has the following effects:

(1) The incorporation of a proper amount of $Al_2O_3$ in the cBN-based sintered material substrate makes it possible to control the density of nuclei formed during the formation of $Al_2O_3$ coating layer and the crystallinity of the $Al_2O_3$ coating layer thus formed and hence produce an $Al_2O_3$ coating layer having an excellent adhesion to the substrate and a good crystallinity.

(2) An $Al_2O_3$ coating layer oriented on (012), (104),(110), (113),(024) and (116) planes having an excellent wear resistance and strength can be formed on the surface of the tool to be abraded by the material to be cut.

(3) The coated sintered material having the foregoing effects (1) and (2) can provide a cutting tool which exhibits a prolonged life in cutting of iron-based high hardness difficultly-cuttable materials or high speed and efficiency cutting of steel, which can be effected over a reduced period of time or impossible with existing tools due to the rise in cutting temperature.

What is claimed is:

1. A cutting tool made of $Al_2O_3$-coated cBN-based sintered material comprising:
   cBN-based sintered material substrate;
   one or more $Al_2O_3$ layers coating said cBN-based sintered material on at least a part of a surface of said cBN-based sintered material substrate taking part in cutting; wherein said sintered material substrate comprises cBN in an amount of from 20% to 99% by volume and $Al_2O_3$ having an average crystalline particle diameter of not more than 1 μM in an amount of from not less than 1.0% to less than 10% by volume, said $Al_2O_3$ layer has a thickness (d) of from 0.5 μm to 50 μm, and the average crystalline particle diameter (s) of $Al_2O_3$ is from 0.01 μm to 4 μm if the thickness (d) of said $Al_2O_3$ layer is from 0.5 μm to 25 μm (0.5 μm≦d≦25 μm)or the average crystalline particle diameter (s) of $Al_2O_3$ is from 0.01 μm to 10 μm if the thickness (d) of said $Al_2O_3$ layer is from more than 25 μm to 50 μm (25 μm<d<50 μm).

2. The cutting tool made of $Al_2O_3$-coated cBN-based sintered material according to claim 1, wherein said cBN sintered material substrate comprises $Al_2O_3$ in an amount of from not less than 3.0% to less than 5.0% by volume.

3. The cutting tool made of $Al_2O_3$-coated cBN-based sintered material according to claim 1, wherein said $Al_2O_3$ layer comprises α-$Al_2O_3$ as a main component.

4. The cutting tool made of $Al_2O_3$-coated cBN-based sintered material according to claim 1, wherein said $Al_2O_3$ layer comprises α-$Al_2O_3$ having an orientation index TC(012) of not less than 1.0, TC(104) of not less than 1.0, TC(110) of not less than 1.0, TC(113) of not less than 1.0, TC(024) of not less than 1.0 or TC(116) of not less than 1.0 and said orientation index is defined by the following equation:

$$TC(hkl)=I(hkl)/Io(hkl) \times [(1/n)\Sigma\{(hkl)/Io(hkl)\}]^{-1}$$ where
I(hkl): Intensity of (hkl) diffraction ray in XRD;
Io(hkl): Diffraction intensity in ASTM card of XRD; and
n: Number of diffraction rays used in calculation ((hkl) diffraction rays used are (012),(104),(110),(113),(024) and (116).

5. The cutting tool made of $Al_2O_3$-coated cBN-based sintered material according to claim 1, further comprising an interlayer made of $TiC_xN_yO_z$ provided at the interface of said $Al_2O_3$ with said cBN-based sintered material substrate.

6. The cutting tool made of $Al_2O_3$-coated cBN-based sintered material according to claim 1, wherein a plurality of $Al_2O_3$ layers are provided, each of which are laminated with a $TiC_xN_yO_z$ layer interposed therebetween; and the total thickness of the plurality of $Al_2O_3$ layers is used as the thickness of said $Al_2O_3$ layer.

7. The cutting tool made of $Al_2O_3$-coated cBN-based sintered material according to claim 1, wherein a $TiC_xN_yO_z$ layer is coated as an outermost layer thereof.

8. The cutting tool made of $Al_2O_3$-coated cBN-based sintered material according to claim 1, wherein said cBN-based sintered material substrate comprises cBN and a binder phase, and said binder phase comprises at least one selected from the group consisting of nitride, carbide and boride of metals belonging to the groups 4a, 5a and 6a in the periodic table and mutual solid-solution thereof.

* * * * *